United States Patent
Schwarzkopf

(10) Patent No.: US 9,473,051 B2
(45) Date of Patent: Oct. 18, 2016

(54) METHOD AND DEVICE FOR POSITIONING A BRUSHLESS ELECTRIC DRIVE

(71) Applicant: Brose Fahrzeugteile GmbH & Co. KG, Wuerzburg, Wuerzburg, DE (US)

(72) Inventor: Johannes Schwarzkopf, Marktheidenfeld (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 12 days.

(21) Appl. No.: 14/531,581

(22) Filed: Nov. 3, 2014

(65) Prior Publication Data
US 2015/0054436 A1 Feb. 26, 2015

Related U.S. Application Data

(63) Continuation of application No. PCT/EP2013/001299, filed on May 2, 2013.

(30) Foreign Application Priority Data

May 2, 2012 (DE) .......................... 10 2012 008 883

(51) Int. Cl.
| | | |
|---|---|---|
| H02K 29/10 | (2006.01) | |
| H02P 6/00 | (2016.01) | |
| H02P 6/20 | (2016.01) | |
| H02P 6/24 | (2006.01) | |

(52) U.S. Cl.
CPC ................ *H02P 6/002* (2013.01); *H02P 6/20* (2013.01); *H02P 6/24* (2013.01); *H02P 6/28* (2016.02)

(58) Field of Classification Search
CPC ...... H02K 35/02; H02M 7/066; H02P 6/002; H02P 6/20
See application file for complete search history.

(56) References Cited

U.S. PATENT DOCUMENTS

| | | |
|---|---|---|
| 5,656,897 A | 8/1997 | Carobolante et al. |
| 7,417,393 B2 | 8/2008 | Okamura et al. |
| 2004/0069901 A1* | 4/2004 | Nunnally ................ B64C 27/20 244/34 R |
| 2013/0285591 A1 | 10/2013 | Suzuki |

FOREIGN PATENT DOCUMENTS

| | | |
|---|---|---|
| CN | 1551478 A | 12/2004 |
| CN | 1830134 A | 9/2006 |
| EP | 1 478 086 A2 | 11/2004 |
| JP | 2002-291288 A | 10/2002 |
| JP | 2007-236048 A | 9/2007 |

OTHER PUBLICATIONS

Chinese Office Action for Chinese Application No. 201380023184.7 dated May 5, 2016—English translation.

* cited by examiner

*Primary Examiner* — Karen Masih
(74) *Attorney, Agent, or Firm* — Muncy, Geissler, Olds & Lowe, P.C.

(57) ABSTRACT

A method for positioning a brushless electric drive comprising a stator that has at least one phase winding to which a voltage signal can be applied, and a rotor equipped with magnetic poles. In the method, a voltage signal is applied to the at least one phase winding, the voltage signal generates a magnetic field as a result of the current flowing in the phase winding. The magnetic field putting the rotor into alignment, and as long as the rotor is in motion, the voltage signal is modified in accordance with the intensity of the current induced in the at least one phase winding by the moving rotor, in such a way that the induced current is increased.

12 Claims, 3 Drawing Sheets

METHOD AND DEVICE FOR POSITIONING A BRUSHLESS ELECTRIC DRIVE

This nonprovisional application is a continuation of International Application No. PCT/EP2013/001299, which was filed on May 2, 2013, and which claims priority to German Patent Application No. DE 10 2012 008 883.3, which was filed in Germany on May 2, 2012, and which are both herein incorporated by reference.

BACKGROUND OF THE INVENTION

1. Field of the Invention

The present invention relates to the field of electrotechnology, especially the field of electric drives, and concerns brushless drives.

2. Description of the Background Art

Electric motors, in which a rotor rotates in the magnetic field of a stator, whereby the rotor has rotor windings that can be supplied with alternating current strengths to excite a rotor field, are widespread in the field of electric drives. The electric current is supplied to the rotor windings via an electromechanical commutator device with current-conducting brushes, which brush the rotor-side commutator lamellae during the rotation of the rotor.

In many fields, these drives, which require a commutator device, have been replaced by so-called brushless electrical drives that have permanent magnets in the rotor, which move in the rotating magnetic field of the stator windings. A complex control of the currents through the stator windings is necessary to drive such motors, whereby it is typical to feed the stator windings with pulse-width-modulated voltage signals, generated by semiconductor switches.

For optimal control of such a brushless drive, it is particularly necessary in the startup phase to determine the rotor's angular position. Slippage can be minimized and the rotational speed optimally controlled in this way during operation of the drive.

It is known for determining the position of the rotor to use at least one Hall sensor for measuring the magnetic field strength, the sensor being disposed on the stator and registering the movement and position of the rotor's magnetic poles. During operation of the drive, the currents induced in the phase windings by the relative movement of the rotor can be measured and the position and rotational speed can be determined from them.

A task that is especially difficult to solve is to determine the position of the drive at very low rotational speeds or when at rest without the use of sensors and/or particularly to bring the rotor into a target start position.

SUMMARY OF THE INVENTION

It is therefore an object of the present invention to provide a method and a device that enable a reliable and rapid at-rest positioning of a brushless electric drive.

The invention thus relates to a method for positioning a brushless electric drive comprising a stator having at least one phase winding, to which a voltage signal can be applied, and a rotor equipped with magnetic poles.

Reliable positioning and rapid deceleration of the rotor are achieved according to an embodiment of the invention with the following steps. A voltage signal generating a magnetic field by the current flowing in the phase winding is applied to the at least one phase winding, causing an alignment of the rotor. The voltage signal is controlled, as long as the rotor is moving, depending on the current strength of the current induced in the at least one phase winding by the rotor movement, such that the induced current is increased.

The invention is based on the realization that in the case of the basically known alignment of a drive by application of a voltage vector, the rotor continues to move in the arising stator magnetic field until it reaches a rest position, and that by the residual movement of the rotor in the phase windings a current is thereby induced, which basically works against the residual movement in a damping manner. The movement-decelerating induced currents are increased by the control of the voltage signal or a plurality of phase voltage signals as taught by the invention, so that the damping and thereby the deceleration process of the rotor movement are accelerated. Simultaneously, however, it must be assured that the current strengths in the phase windings remain within a current strength range that is still sufficient to bring about an alignment of the drive/rotor, but is not so high that a driving of the rotor is brought about.

An embodiment of the method of the invention in the case of a stator, which has at least two phase windings, therefore provides that the sum and difference of the current strengths in the individual phase windings are determined and regulated.

Regulation of the sum of the current strengths in the individual phase windings assures that the magnetic fields generated by the phase windings are sufficient for aligning the drive. Because the voltages induced by the rotor's movement produce differences between the current strengths in the individual phase windings, the current strength differences are directly associated with the movement-damping, induced currents. It is desirable, therefore, to increase the differences in the current strengths in the phase windings.

An embodiment of the invention in this regard in an electric drive with a stator that has at least two phase windings to which a phase voltage signal can be applied, provided that a voltage vector, which contains at least two phase voltage signals and brings about alignment of the rotor, is applied to the two phase windings. The phase voltage signals are controlled such that the current flowing in the phase windings is within a target range with respect to the sum of the current strengths in the phase windings, and that simultaneously the difference of the current strengths prevailing in the phase windings is increased.

It is practical for carrying out the method that the difference of the current strengths in the individual phase windings is continuously determined and increased. It can be provided advantageously, furthermore, that the difference of the current strengths in the individual phase windings is supplied to a proportional controller. The output of the proportional controller then acts on the phase voltage signals that are supplied to the individual phase windings.

A further embodiment of the invention provides that the sum of the current strengths in the individual phase windings is determined and regulated within a target current strength range.

It can be provided further that an integral controller is used in the regulation of the sum of the current strengths in the phase windings.

In order to achieve the most rapid reaction possible of the regulation of the sum of the current strengths, it can also be provided to use a proportional controller in the regulation of the sum of the current strengths. It can be especially advantageous to use a combined proportional/integral controller.

The phase voltage signals applied to the phase windings can be used as manipulated or control variables for regulating the current strengths in the phase windings. These can advantageously together form a time-dependent voltage vector and be configured as pulse-width-modulated signals, so that the control of these signals can occur by means of a selective change in frequency or pulse width.

In addition to a method for positioning a brushless electric drive, the invention also relates to a device for carrying out a method for a brushless electric drive having at least two phase windings to which a phase voltage signal can be applied. The device has a first unit for determining the sum of the current strengths through the two phase windings and a second unit for determining the difference of the current strengths through the two phase windings and a control unit, which keeps the sum of the current strengths within a target range and increases the difference of the current strengths.

According to an embodiment, the device of the invention has a proportional controller and/or a combined proportional/integral controller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
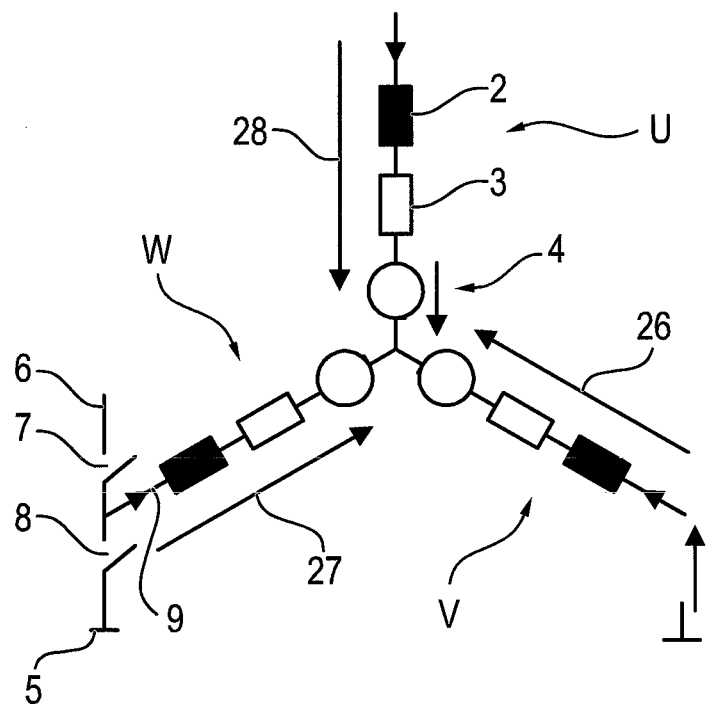
FIG. 1 shows schematically an equivalent circuit of a stator with three phase windings connected in a star connection.

In FIG. 1, a star connection of an electric drive with three phase windings U, V, W with a neutral point 1 is shown schematically. The individual phase windings are each shown in the form of an equivalent circuit each with an inductor 2, an ohmic resistor 3, and a voltage (EMK, EMF) represented by a circle 4, which is induced by the rotor's movement. The voltage dropping across a phase winding U, V, W is represented by arrows 26, 27, 28 and arises as the sum of the voltage drops across inductor 2 and ohmic resistor 3 and the induced voltage. The overall dropping voltage 26, 27, 28 including the induced voltage in each case generates a phase current through the particular phase winding U, V, W.

This type of brushless electric drive, operated in a star connection, can be controlled via a so-called W6 connection, for example, by which in rapid time sequence a higher DC voltage level or a lower DC voltage level, particularly a ground potential, can be applied selectively to each of the phase windings U, V, W. Such an electric drive can be controlled thereby with respect to rotational speed, power, and rotation direction. Typically, the control occurs via a pulse-width-modulated voltage signal, in which the frequency and pulse width are basically modifiable, in order to control the intensity of the magnetic field generated in each case.

Figure 2:
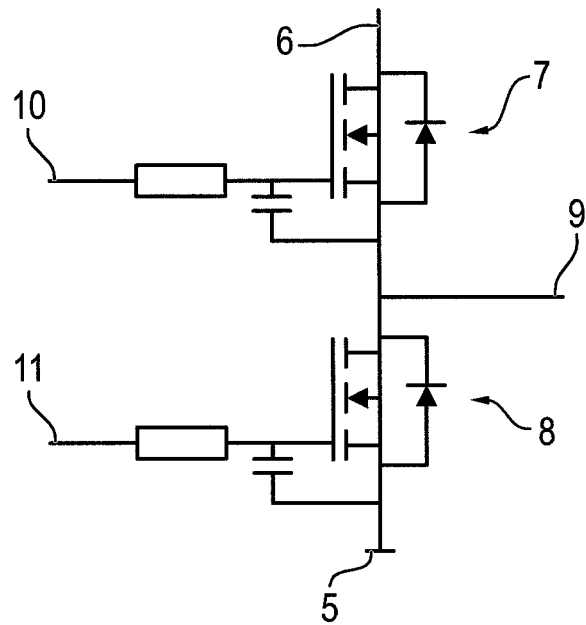
FIG. 2 shows a semiconductor switch bridge for controlling a phase winding in a W6 connection.

By means of a semiconductor switch bridge, shown in greater detail in FIG. 2, an individual phase, for example, phase W, can be connected by means of two switches 7, 8 over a phase terminal 9 of phase winding W either to a higher DC voltage potential 6 or to a lower DC voltage potential 5, particularly a ground potential.

If switch 7 is closed and switch 8 opened, terminal 9 of phase winding W is connected to the higher voltage potential. If terminal 7 is opened and terminal 8 closed, terminal 9 of phase winding W is connected to the ground potential. A circuit logic prevents switches 7, 8 from being closed simultaneously. Depending on the switch position of individual switches 7, 8, two different voltage levels can be applied to phase winding W. Thereby a pulse-width-modulated signal can be applied to phase winding W by a rapid change in the switching states. This also applies to the phases or phase windings U and V that are controlled by other semiconductor switch bridges, which are not shown.

Switches 7, 8, which correspond, for example, to the switches shown in FIG. 1, are suitably realized as MOSFETs, each of which can switch through or block and can be controlled by a control voltage with respect to their switching states via control voltage inputs 10, 11. A DC voltage pulse of a higher voltage level or a lower voltage level or a ground potential can thus be applied selectively by suitable control of control voltage inputs 10, 11 to a phase winding of a circuit, for example, a star connection of an electric drive, but also a delta connection or other possible circuits. In the case of one or more phase windings of a brushless electric drive, a control with pulse-width-modulated signals is made possible thereby.

A voltage vector can be applied to the drive in order to bring such an electric drive or the rotor thereof into a defined position, i.e., into a defined angular position of the magnetic poles of the rotor relative to the stator. In other words, certain defined voltage signals, which do not bring about any rotatory driving of the rotor but generate a magnetic field of the stator in which the poles of the rotor align, can be applied to the individual phase windings.

For this purpose, for example, one of the phase windings can be connected to the ground potential and a pulse-width-modulated signal can be applied to each of the other two phase windings. The application of a DC voltage potential or other signal forms to the two other phases is also conceivable.

If the rotor is not yet at rest, i.e., it oscillates, for example, in a rotary oscillation around a potential minimum, the current induced by the residual movement in the phase windings basically works against the movement, therefore in a damping manner. Depending on the resistance, the magnetic properties, and the mechanical inertia of the system and the initial speed of the rotor, the oscillation can last several seconds, until it is damped dissipatively until the rest position is reached.

According to an embodiment of the invention, first the individual voltage signals of the voltage vector are set such that the rotor begins to align. For example, the phase winding U is connected to the ground potential, whereas a suitable pulse-width-modulated signal is applied to the phase windings V and W. Other arrays of voltage vectors are also conceivable. The current strengths of the currents in the phases or phase windings V and W are measured continuously. The measured current strengths are input variables for a control unit 30 for the voltage signals applied to phase windings V and W.

Figure 3:
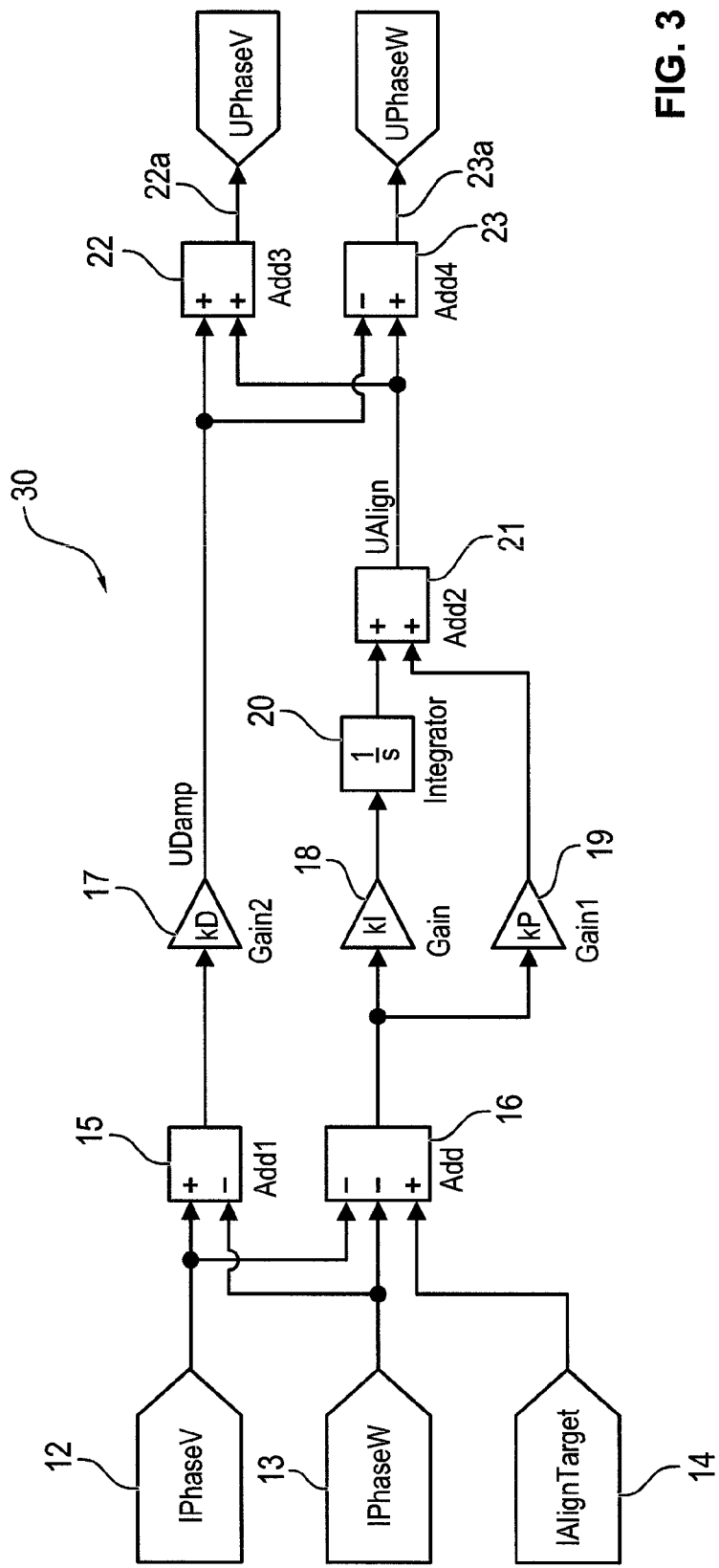
FIG. 3 shows an exemplary control unit.

Control unit 30, which is shown by way of example in FIG. 3, follows two specifications:

1. The sum of the current strengths of the currents in the phase windings V and W is kept within a target range, so that, on the one hand, the rotor can align in the stator field, and, on the other, no rotary driving of the rotor occurs.

2. The differences generated by the induced voltage between the current strengths in the phases or phase windings V and W represent the induced, damping currents and should be increased by suitable control of the input voltages at the phase windings. The control process is carried out until a termination criterion is met, which can be the falling below a specific threshold of the induced current or the induced voltage, for example.

The control unit 30 shown in FIG. 3 first has three inputs 12, 13, 14. In this case, the current strength measured in phase winding V is supplied to input 12, the current strength measured in the phase winding W to input 13, and a target value of an alignment current strength quantity to be reached as a termination criterion to input 14. This current strength is achieved when the deviation of the current strengths measured in phase windings U, V, W from the current strength expected due to the applied voltage signals is minimized, so that the effect of the induced currents is below a defined threshold.

In a first step of control unit 30, in a first adder 15 the current strength value of phase (phase winding) V is added to the inverted current strength value of the phase (phase winding) W, and accordingly as a result there is a difference between the two current strengths. In second adder 16, the current strengths in the phase windings V and W are added and inverted and the inverted value is added to the setpoint at input 14, so that overall a difference between the current strength sum in the two phase windings V, W, is generated, on the one hand, and the target current strength at input 14, on the other.

The output quantity of first adder 15 is supplied to a first amplifier 17, which therefore increases the difference between the current strengths and the phases (phase windings) V and W with an amplification factor. The amplification factor of first amplifier 17 can either be fixedly preselected or set dynamically during the alignment process, in that the resistance of the phase winding is determined from the alignment current and the alignment voltage and then the amplification factor is maximized with consideration of tolerances and time behavior of the overall setup.

The output of second adder 16 is supplied to a second amplifier 18 and a third amplifier 19, whereby an integrator 20 is connected downstream of second amplifier 18. The output of integrator 20 is also connected to a third adder 21, like the output of amplifier 19. Thereby a combination of the integrator regulator with a proportional controller for controlling the sum of the current strengths in phase windings V and W takes place in this branch of control unit 30.

As a result, the quantity present at the output of amplifier 17 represents a difference of the current strengths determined in the two phase windings V, W, whereas the output of third adder 21 represents a quantity associated with the sum of the current strengths of the currents flowing in the phase windings V, W. The quantities representing the sum and difference of the current strengths are added in parallel in a fourth adder 22 and subtracted from one another in a fifth adder 23 or added after inverting of an input. The signals are thus decoupled via the two parallel adders 22, 23, so that independent regulations for output 22a and output 23a are generated, which carry the input signal for the generation of the phase voltage signals for the phases (phase windings) V and W. For example, pulse-width-modulated signals are generated because of the voltages present at outputs 22a and 23a.

The structure of the regulator will be shown below based on the formulaic representation for the two basic control tasks, namely, on the one hand, to regulate the current for the aligning of the rotor within a target range and, on the other, to increase the damping current portions:

On the one hand, the sum and, on the other, the difference of the measured current strengths in the phase windings are selected as input quantities for control unit 30, as shown in FIG. 3. Here, the following applies:

$$I_{AlignActual}=I_V+I_W \text{ and } I_{Damp}=I_V-I_W.$$

$I_{AlignActual}$ together with the target value is supplied to a suitable controller, particularly the bottom branch of control unit 30 from FIG. 3, e.g., a PI controller. It follows:

$$U_{AlignActual}=f(I_{AlignActual},I_{Target})=k_I*\int((I_{Target}-I_{AlignActual})dt+k_p*(I_{Target}-I_{AlignActual})$$

If a P controller is selected for the damper (top branch of control unit 30 shown in FIG. 3), it follows:

$$U_{Damp}=f(I_{Damp})=k_D*I_{Damp}$$

If now the following are selected as input quantities for the generation of the phase voltage signals at the output of control unit 30:

$$U_V=U_{AlignActual}U_{Damp} \text{ and } U_W=U_{AlignActual}-U_{Damp}$$

(outputs of the fourth and fifth adders 22 and 23), the controllers (the two branches of control unit 30) do not influence each other. In other words, the two control processes for both phase voltage signals of phase windings V and W can be decoupled by the sum and difference formation of the signals in the output stage of control unit 30.

Figure 4:
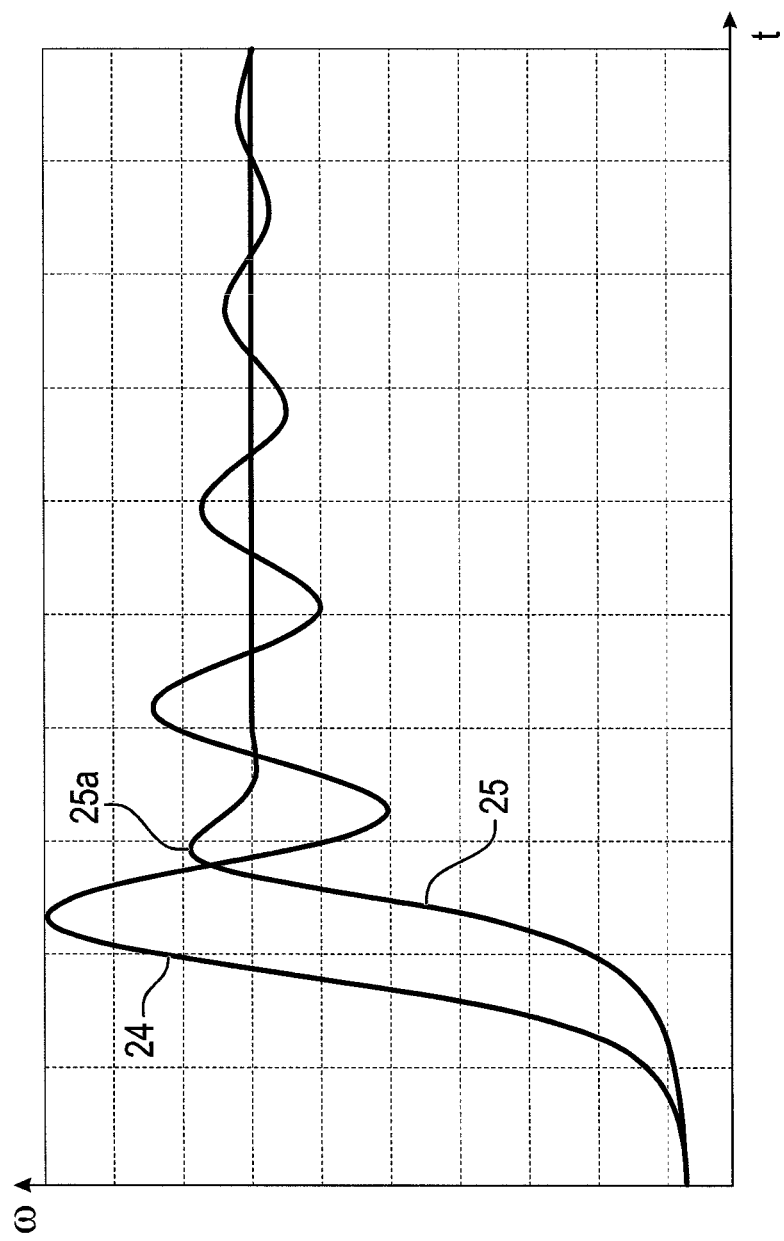
FIG. 4 shows time-resolved a diagram of the movement of a rotor until it reaches a rest position with and without damping.

Measured data of a rotor's movement behavior in an alignment are shown in FIG. 4. Two movement curves are shown in the diagram, whereby the time is plotted on the x-axis and the angular position on the y-axis. A first curve 24 shows the movement behavior in a passively damped electric drive, in which the damping occurs substantially by the currents induced in the phase windings. The expected curve is shown with a substantially exponential damping. The decline in the movement typically lasts a few seconds.

The second curve 25 shows the movement behavior in the case of an electric drive in which the method of the invention is used by means of a device of the invention. After a first peak 25a, hardly any other excursions can be seen. The damping is ended when the rest state after one to two oscillation cycles is reached.

It is evident that by the method of the invention a brushless electric drive can be aligned very rapidly, i.e., within fractions of seconds, and brought into a rest position, so that a defined startup of the drive is possible after a short time.

In the simplest case, the elapse of a fixed period of time, after which according to experience the rotor has come to rest in any event, can be selected as the termination criterion of the method of the invention for positioning the drive.

Another criterion is the consideration of the current strength difference in two phase windings, because this represents the quantity of the induced current and thereby the rotor's motion speed. If the current difference for a defined measurement period falls below a defined threshold, the method can be ended. Alternatively, the square of the current strength difference can also be observed for a predefined period of time and compared with a threshold. The threshold can depend on the initial value of the current strength difference or a phase voltage signal difference, so that changes in system properties due to temperature changes and the like can be taken into account. As a termination criterion, the current strength difference of the currents in two phase windings can also be passed through a low pass, whose output is monitored to see whether the output quantity falls below a threshold value.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for positioning a brushless electric drive comprising a stator having at least one phase winding, to which a voltage signal is applied, and a rotor equipped with magnetic poles, the method comprising:
   applying a voltage signal, which generates a magnetic field by a current flowing in the phase winding, to the at least one phase winding causing an alignment of the rotor; and
   controlling the voltage signal, as long as the rotor is moving, depending on a current strength of the current induced by the rotor movement in the at least one phase winding, such that the induced current is increased.

2. The method according to claim 1, further comprising a stator with at least two phase windings to which a phase voltage signal is applied, wherein a sum and difference of current strengths in the individual phase windings are determined and regulated.

3. The method according to claim 1, further comprising a stator with at least two phase windings to which a phase voltage signal is applied, wherein a voltage vector that contains at least two phase voltage signals and brings about alignment of the rotor, is applied to the two phase windings, wherein the phase voltage signals are controlled such that the current flowing in the phase windings lies within a target range with respect to a sum of the current strengths in the phase windings, and wherein substantially simultaneously the difference of the current strengths prevailing in the phase windings is increased.

4. The method according to claim 2, wherein a difference of the current strengths in the individual phase windings is continuously determined and increased.

5. The method according to claim 4, wherein the difference of the current strengths in the individual phase windings is supplied to a proportional controller.

6. The method according to claim 2, wherein the sum of the current strengths in the individual phase windings is determined and regulated within a target range.

7. The method according to claim 6, wherein an integral controller is used in the regulation of the sum of the current strengths.

8. The method according to claim 6, wherein a proportional controller or a combined proportional/integral controller is used in the regulation of the sum of the current strengths in the phase windings.

9. The method according to claim 1, wherein, for regulating the current strengths in the phase windings, the phase voltage signals applied to the phase windings are controlled as manipulated variables.

10. The method according to claim 1, wherein the phase voltage signals are pulse-width modulated.

11. A device for carrying out a method according to claim 1, wherein, in a case of a brushless electric drive having at least two phase windings to which a phase voltage signal is applied, the device comprises:
   a first unit for determining the sum of the current strengths through the two phase windings;
   a second unit for determining the difference of the current strengths through the two phase windings; and
   a control unit, which keeps the sum of the current strengths within a target range and increases the difference of the current strengths.

12. The device according to claim 11, further comprising a proportional controller and/or a combined proportional/integral controller.

* * * * *